Patented Aug. 21, 1928.

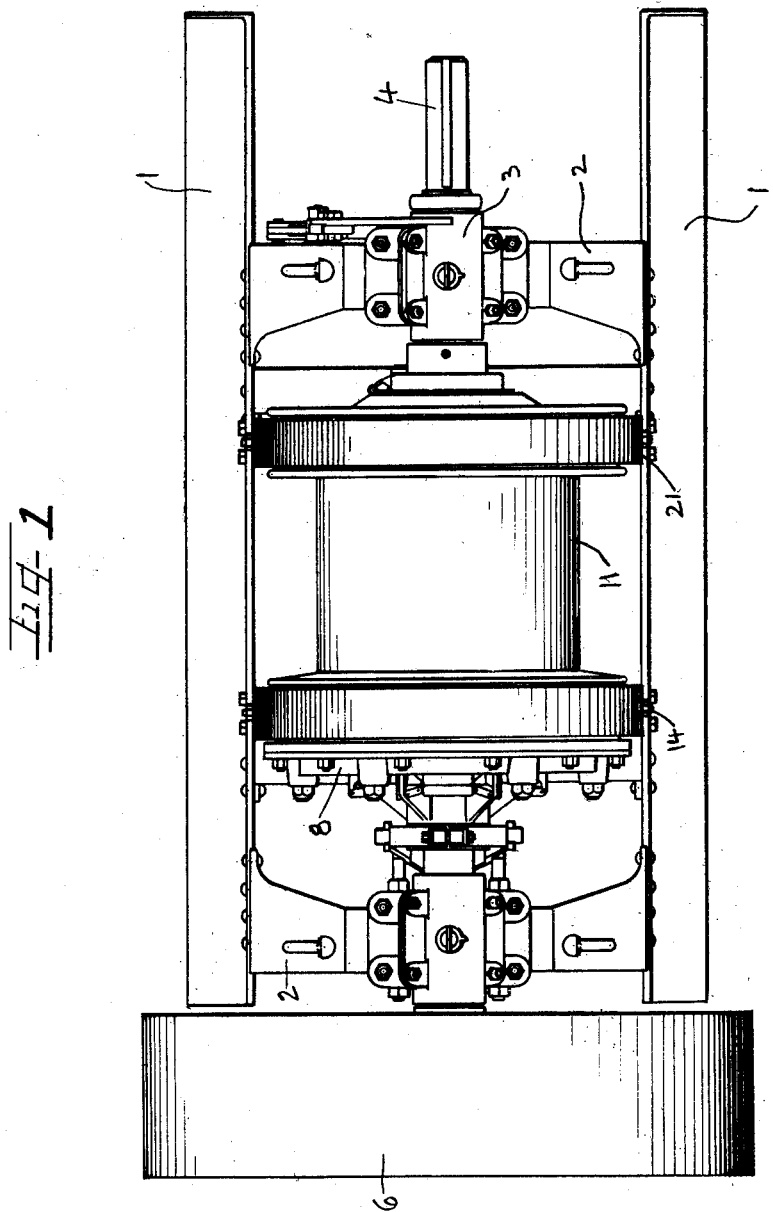

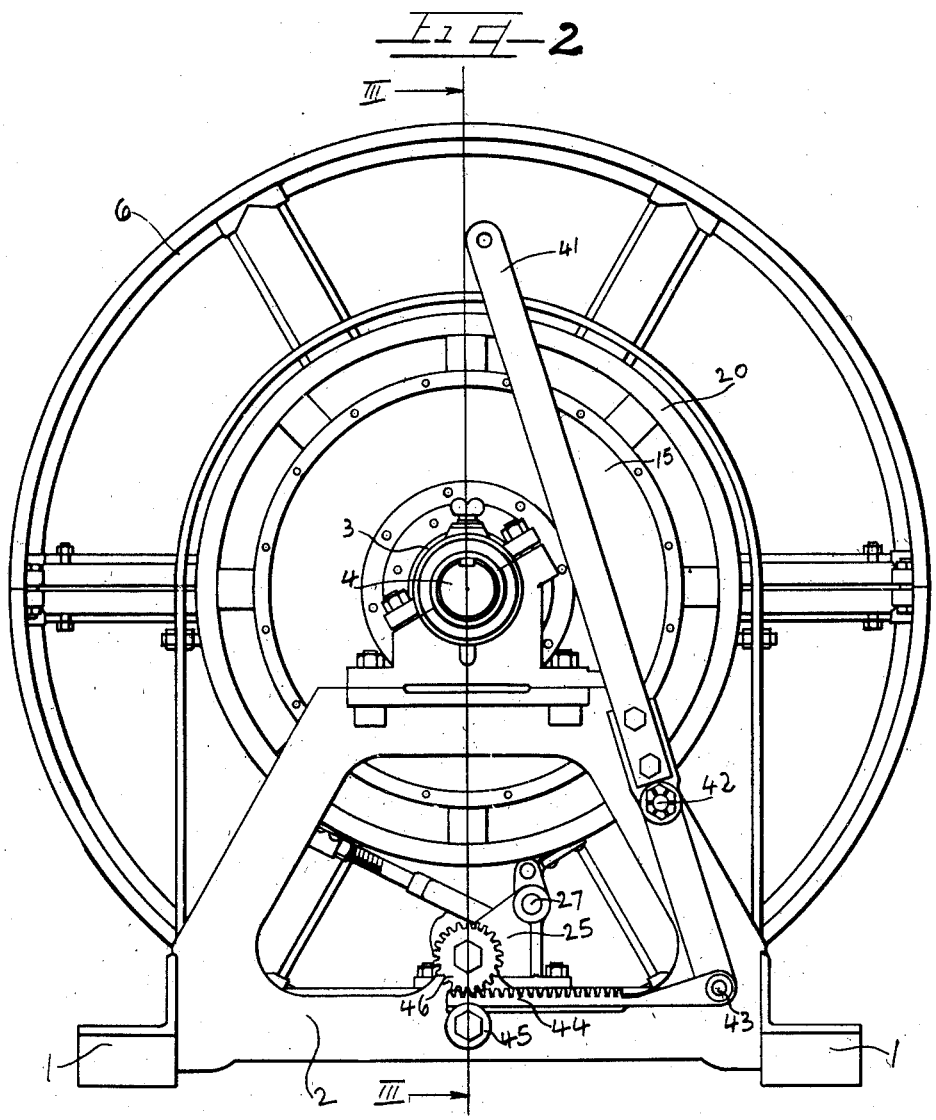

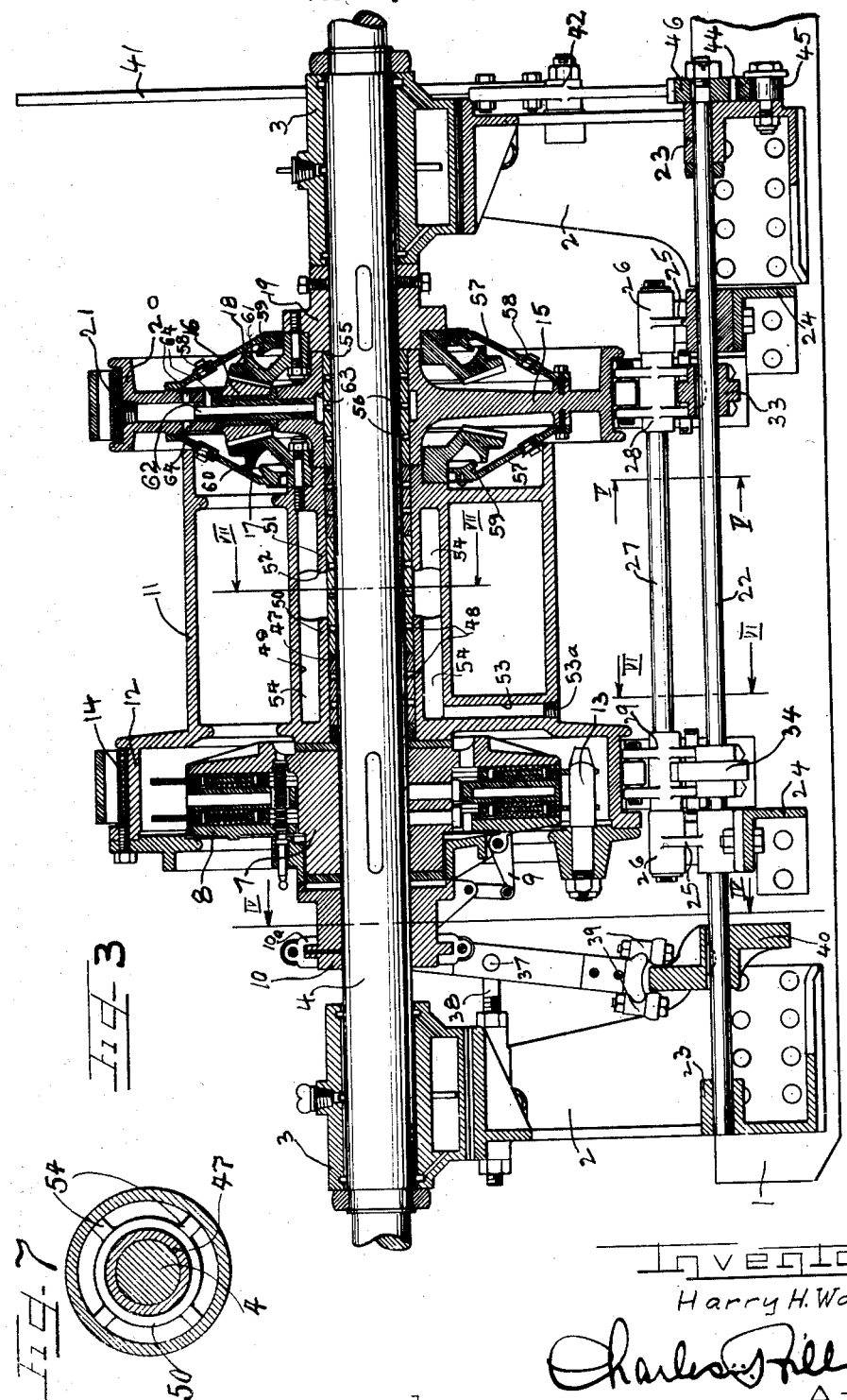

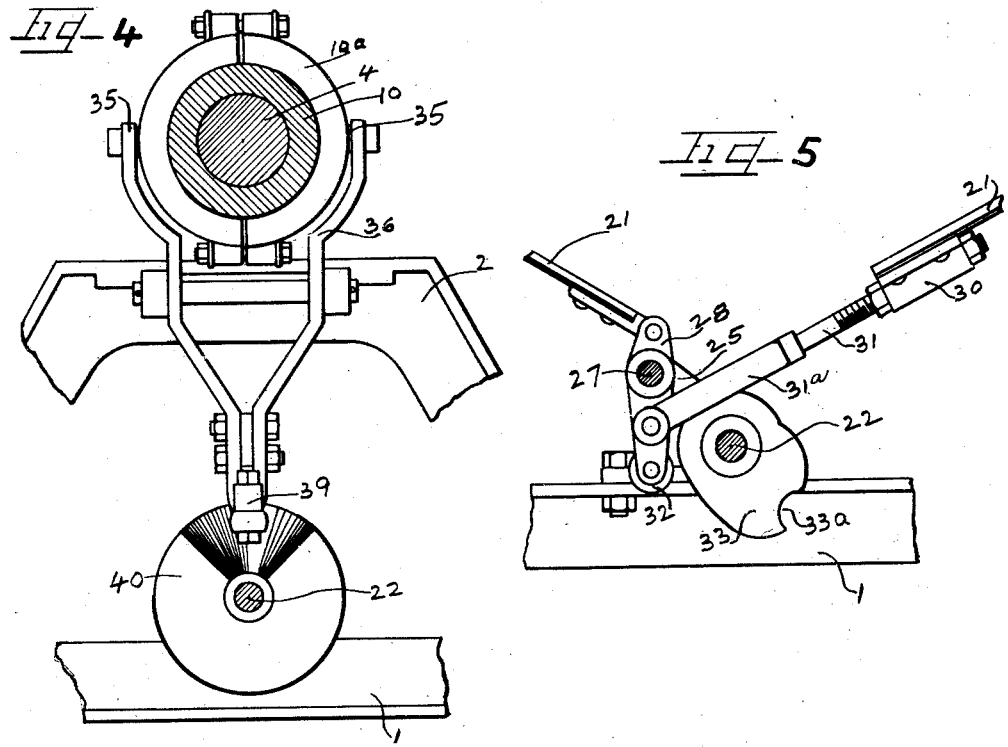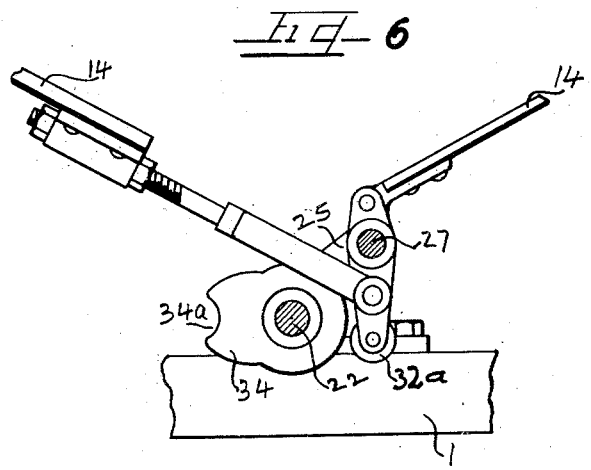

1,681,384

UNITED STATES PATENT OFFICE.

HARRY H. WATERS, OF CLINTON, IOWA, ASSIGNOR TO CLIMAX ENGINEERING COMPANY, A CORPORATION OF DELAWARE.

CLUTCH AND CONTROL MECHANISM.

Application filed April 25, 1927. Serial No. 186,324.

This invention relates to improvements in clutches and the control mechanism therefor, and more particularly to the control mechanism for a reversing clutch for planetary reversing pulleys, transmission or hoisting drums or the like, whereby forward, neutral and reverse clutches and brakes are operated under unitary control by a series of cams so located that the various operations, including free operation of the drum, are performed automatically and in the proper synchronism, thereby eliminating the use of the heretofore known conventional methods of control employing bell cranks, links and the like, which previously known methods were accompanied by objectionable lost motion, non-dependability, and waste space.

In the present construction I have embodied the improved neutral brake construction shown and described in my U. S. Letters Patent No. 1,619,449, granted to me on March 1, 1927, said construction having been found to serve admirably in the improved combination provided herein.

It is an object of this invention to provide improvements in reversing transmissions, clutch pulleys, hoisting or cable drums or the like in which forward motion is obtained by means of a clutch, and reverse motion through planetary gears by clamping the spider supporting these gears, which improvement consists in actuating the forward, neutral and reversing clutches or brakes with the aid of a single lever and camshaft, thereby permitting an operator to control all of the operations with minimum exertion on the single lever and with a reasonably short travel of the lever.

It is a further object of this invention to provide a device of the class described having automatic locking means for quickly stopping the drum and holding the same in stopped position if desired immediately after the release of the forward driving clutch.

A further object of this invention is to provide a device of the class described in which all of the clutches or brakes are operated by cams, individual to each, the cams being properly timed so that there will be no overlapping of action and providing a short interval between the various positions and operations where all brakes and clutches will be disengaged.

A still further object of this invention is to provide efficient and automatic means for lubricating a device of the class described, which lubrication is accomplished with a minimum loss of lubricating fluid or the like, special precautions being taken against the leakage of the same.

Other and further important objects of this invention will be apparent from the disclosures in the drawings and specification.

This invention (in a preferred form) is illustrated in the drawings and hereinafter more fully described.

On the drawings:

Figure 1 is a top plan view of a device embodying features of this invention.

Figure 2 is an end view of a device taken from the right of Figure 1.

Figure 3 is a vertical sectional view taken substantially along line III—III of Figure 2.

Figure 4 is a view taken substantially along line IV—IV of Figure 3 showing the clutch actuating means.

Figure 5 is a view taken substantially along line V—V of Figure 3 showing the reverse brake actuating means.

Figure 6 is a view taken substantially along line VI—VI of Figure 3 showing the neutral brake actuating means.

Figure 7 is a sectional view taken substantially on line VII—VII of Figure 3.

As shown on the drawings:

In the illustrated embodiment of this invention there is shown a self-contained unit or complete jackshaft unit adapted to be placed between the power and the load for the purpose of starting, stopping and reversing, and permitting free operation of a driven machine. Of course, the power may be transmitted by belt, chain or gears as desired. This self-contained unit comprises a pair of parallel base members 1 supporting thereabove a pair of end frames 2. Mounted on the end frames 2 are bearings 3 which provide bearing surfaces for a live shaft 4. The shaft 4 extends beyond the bearings in each direction and at one end is provided with an outboard pulley wheel 6, the other end of which may be connected to a power source or to a machine to be driven as desired.

Keyed to the live shaft 4 is a flanged hub 7, and engageable with the flanges of this hub 7 is a multiplate clutch 8 which is actuated by toggle mechanism 9, in turn connected to a sleeve 10 free and slidable upon the shaft 4. The sleeve 10 has a circumscribing portion 10$^a$ therearound for a purpose hereinafter described. A hoist or pulley drum 11 is loosely mounted on the shaft 4 adjacent the hub 7, and has integral therewith a brake band drum 12 to which is secured a plurality of pins 13. The clutch 8 is slidable longitudinally in the pins 13 and will rotate therewith. Around the brake band drum 12 is the neutral brake band 14.

Freely and separately mounted on the shaft 4 adjacent the drum 11 is a spider 15 which carries rotatably mounted thereon bevel pinions 16. Planetary reversing gears are enclosed by the spider 15 and consist of the bevel pinions 16 which mesh on one side of the spider 15 with a gear 17 carried by the drum 11 and on the other side with a gear 18 carried by a sleeve 19 which is keyed to the shaft 4. The periphery of the spider 15 forms a brake band drum 20 for a reverse brake band 21.

One of the principal feautres of this invention is the unitarily controlled mechanism for operating the clutch 8, neutral brake 14 and reverse brake 21. This mechanism includes a camshaft 22 suitably journalled to the end frames 2 at 23. Secured to the base members 1 is a pair of transverse angle irons 24 which support brackets 25 upon which are mounted journals 26 for a pivot shaft 27 which is disposed above and to the rear of camshaft 22 as shown in Figures 2 and 3. Loosely mounted upon the pivot shaft 27 adjacent either end thereof are bifurcated levers 28 and 29, respectively.

One end of the reverse brake band 21 is secured to the lever 28 at a point above the shaft 27, and the other end of the brake band is secured to a socket 30 through which a threaded adjustable pull rod 31 passes, which in turn is engaged in a socket 31ª connected to the lever 28 at a point below the shaft 27. Freely suspended between the bifurcations of the lower end of the lever 28 is a roller 32 which is adapted to be engaged by a cam 33 fixedly mounted upon the camshaft 22. The neutral brake band 14 is similarly secured to the lever 29 which also has a roller 32ª freely attached between the bifurcations of its lower end and which is adapted to be engaged by a cam 34 fixedly mounted on the shaft 22. The cams 33 and 34 are provided with substantially semi-circular recesses 33ª and 34ª respectively, which receive the rollers 32 and 32ª and provide a locking engagement for their respective brakes.

Depending from the circumscribing portion 10ª of the sleeve 10 and pivoted thereto at 35 is a clutch shifting fork 36 which is pivoted at 37 to an adjustably mounted stationary rod 38 secured to one of the end frames 2 (Figure 3). Disposed transversely adjacent the lower end of the fork 37 is a pair of cam followers 39 for a cam 40 mounted on the camshaft 22. This cam 40 is always disposed between the followers 39 and adapted to engage either one so as to shift the clutch 8 out or in as the case may be. The cam 40 itself is cylindrical and is of the form of a warped disk and so designed that the active part thereof covers only a small portion of its faces adjacent its periphery.

The camshaft 22 is controlled and operated by a lever 41 pivoted at 42 to an end frame 2 and having its lower extremity pivoted at 43 to a toothed rack 44 which is adapted to ride on a roller 45 and engage with a spur gear 46 fixedly secured to the end of the camshaft 22.

Novel lubricating means have been provided for the various parts of this invention and include a plurality of floating bushings 47 disposed between the shaft 4 and the drum 11 (Figure 3). These bushings 47 are provided with numerous apertures 48 therethrough. A central cavity 49 is provided within the drum 11, and the interior partition or bearing surface of the drum is divided into two parts 50 and 51, leaving a slot 52 therebetween, which slot establishes communication between the cavity 49 and the bushings 47. The cavity 49 also communicates with the exterior of the drum 11 through a passage 53 threaded at its outer end to accommodate a screw plug 53ª. Integral with the bearing walls 50 and 51 there is provided a plurality of fins or vanes 54 which extend substantially across the cavity 50 and terminate adjacent the slot 52 on either side thereof. Lubricating fluid is admitted through the passage 53 into the cavity 49 until this cavity is filled substantially half full. The lubricating fluid reaches the bushings 47 through the slot 52 and trickles through the apertures 48 in the bushings to the shaft 4 thereby providing adequate lubrication for the shaft. The fins 54 keep a sufficient amount of lubricating fluid retained in the cavity 49, so that if the drum is stopped this retained lubricating fluid will gradually pass through the apertures 48 immediately upon starting the drum, whereby the shaft will at no time be devoid of lubrication.

The spider 15 is also separated from the shaft 4 by a floating bushing 55 similar to the bushings 54 and provided with apertures 56 therein (Figure 3). The spider 15 is provided with a housing 57 therearound which is drilled and threaded at various points to accommodate screw plugs 58. On the interior of each side of the housing 57 is an integral upwardly inclined ring 59 so positioned as to collect oil drippings or the like. Integral with the gears 17 and 18 are rings 60 and 61, respectively, so positioned that they extend outwardly substantially over the edge of the rings 59 whereby any drippings of lubricating fluid from the rings 60 and 61, respectively, will be caught by the rings 59. A plurality of passages 62 are provided through the central portion of the spider 15 communicating at one end with a cavity 63 adjacent the bushing 55, and at the other end with passages 64 leading into the interior of the housing 57. Lubricating fluid is placed in both sides of the housing 57 through the openings in which the screw plugs 58 are engageable, and is thrown outwardly towards the rim of the spider 15 by centrifugal force due to the rotation of the spider. The outwardly thrown fluid will thereby provide effective lubrication for the bevel pinions 16 and the gears 17 and 18, and a goodly portion of this fluid enters the passage 62 through the passages 64, passes into the cavity 63, and from this cavity trickles through the apertures 56 to the shaft 4. When the spider is materially slowed down or stopped the fluid in the upper half thereof will be caught by the rings 60 and 61, and the drippings from these rings will be caught by the rings 59 thereby preventing any leakage at the point where the housing 57 joins with the gears 17 and 18. The lubricating means are more fully disclosed, and claimed, in my co-pending application for Letters Patent for "lubricating system" filed August 17, 1927, Serial No. 213,475.

The operation of the novel controlling mechanism hereinabove described is through the medium of manually actuating the lever 41. As shown in the drawings, especially Figure 3, the clutch 8 is in operative engagement with the flanged sleeve 7 and the drum 11 will, therefore, turn with the shaft 4 in the same direction. Assuming now it is desired to reverse the rotation of the drum 11, the live shaft 4, of course, will continue to rotate in its former direction, the lever 41, as shown in Figure 2, is pulled to the right, the rack 44 engaging with the spur gear 46 to rotate the camshaft 22 and the cams 33, 34 and 40 fixed thereon. As the lever is pulled back the warped disk cam 40 engages with the inner of the two followers 39 thereby disengaging the clutch 8 from the flanged sleeve 7. At this moment the clutch and both brake bands are in disengaged position but upon slight movement thereafter the cam 34 abuts the roller 32ª and actuates the neutral brake band 14 to quickly stop the rotation of the drum 11. When the small semi-circular recess 34ª engages with the roller 32ª, the neutral brake band 14 is securely holding the drum 11 in stationary position. Upon slight movement thereafter the recess 34ª passes the roller 32ª and the neutral brake band 14 is released leaving the clutch and both brake bands again in free position. After this second free position of the clutch and brakes the cam 33 engages with the roller 32 on the lever 28 thereby tightening the reverse brake band 21. After the free position has been passed, the recess 33ª in the cam 33 engages the roller 32 and retains the reverse brake band 21 in locked position to thereby hold the spider 15 stationary. The lever 41 will now be in its outermost position. Simultaneously with the locking of the reverse brake band 21, the shaft 4, of course, in the meantime continuing to rotate in the same direction, the drum 11 actuated by the shaft through the sleeve 19 keyed thereto and the planetary reversing gears 18, 16 and 17, respectively, will start rotating in a direction opposite to that of the shaft.

Obviously, when the lever 41 is again pushed inwardly, the above described operations occur in the reverse order, namely: the reverse brake band 21 is released, a free position is reached, the neutral brake band 14 is tightened thereby stopping rotation of the drum, a second free position is reached, after which the clutch 8 is engaged with the flanged sleeve 7 and the drum will then rotate with the shaft in the same direction.

When the device is to be left stationary the lever 41 is placed in mid-position. The clutch 8 will then be out and the recess 34ª in the cam 34 engaged with roller 32ª thereby holding the neutral brake band 14 in locked position, and the reverse brake band 21 will be in disengaged position.

The control mechanism itself affords a greatly simplified structure and is readily adjustable for the correct timing of the operations and to suit the operating conditions. The cams, of course, are so adjusted that the operations are performed automatically and in proper synchronism with a minimum oscillation on the camshaft, which, of course, is oscillated by little exertion upon the actuating lever. The device as a whole including the drum and all actuating mechanism therefor is a self-contained unit, efficiently and automatically lubricated, easily controlled by the manual operation of a single lever and which is positive in its action. It is obvious also that the device is simple in construction affording ready access to all the parts, is very durable and may be economically manufactured and assembled.

I am aware that many changes may be made and numerous details of construction may be varied through a wide range without departing from the principles of this invention and I, therefore, do not purpose limiting the patent granted hereon, otherwise than necessitated by the prior art.

I claim as my invention:

1. In a self contained reversing pulley unit, a clutch, a neutral brake, a reversing brake, a cam associated with each, and unitary means for operating said clutch and brakes.

2. A reversible drum unit or the like including a clutch, a neutral brake, a reversing brake, a cam associated with each and adapted to control the operation thereof, and means for simultaneously actuating said cams.

3. In a transmission, a shaft, a drum thereon, a clutch between said shaft and drum, and means including a cam for actuating said clutch.

4. Control mechanism for a reversing transmission comprising a cam shaft, a plurality of cams thereon, and a lever for actuating said shaft.

5. Control mechanism for a reversing transmission or the like comprising a cam shaft, cams fixed thereon and operatively engageable with elements of said transmission, a gear fixed on said shaft, a rack engageable with said gear, and a control lever connected to said rack.

6. Unitary control mechanism for a reversing transmission including a cam shaft, cams thereon engageable with individual elements of said transmission, a lever adapted to operate said cam shaft, and toothed means connecting said shaft and lever.

7. Unitary control mechanism for a reversing mechanism including a control shaft, controls thereon engageable with the elements of said transmission, a control lever for said shaft, and toothed means connecting said shaft and lever.

8. Control mechanism for a reversing mechanism comprising a shaft, members thereon engageable with elements of said reversing mechanism, a gear on said shaft, a roller, a rack rideable on said roller and engageable with said gear, and an actuating lever for said rack.

9. In a device of the class described including a shaft, a drum thereon, a clutch between said shaft and drum, a fork pivoted to said clutch, a pair of followers on the other end of said fork, and a cam engageable with said followers to actuate said clutch.

10. In a device of the class described, a shaft, a drum thereon, a brake associated with said drum, a spider adjacent said drum, a brake associated with said spider, a second shaft, a pair of levers pivoted thereon, the ends of each brake being connected to one of said levers, and means for actuating said levers.

11. In a device of the class described including forward, reverse and neutral braking mechanisms, a cam for actuating each of said mechanisms, and a unitary control for said cams.

12. In a reversing transmission, a live shaft, a drum thereon, a forward drive clutch, a neutral brake, a reversing brake, a second shaft, levers pivoted on said second shaft, the ends of each of said brakes being secured to one of said levers, a pair of followers connected to said clutch, a cam shaft, cams fixed thereon engaging said levers and followers for controlling and actuating said transmission, and a lever operatively connected to said shaft for operating the same.

13. In a reversing transmission including neutral and reversing brakes, a pivot shaft, levers pivotal thereon, the ends of the neutral brake band being secured to one of said levers above and below the pivot point thereof, the reversing brake band similarly secured to the other of said levers, and control means for said levers to operate them in proper sequence.

In testimony whereof I have hereunto subscribed my name at Clinton, Clinton County, Iowa.

HARRY H. WATERS.